United States Patent
Bui (10) Patent No.: US 6,487,630 B2
(45) Date of Patent: *Nov. 26, 2002

(54) PROCESSOR WITH REGISTER STACK ENGINE THAT DYNAMICALLY SPILLS/FILLS PHYSICAL REGISTERS TO BACKING STORE

(75) Inventor: Tuan H. Bui, Phoenix, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,476

(22) Filed: Feb. 26, 1999

(65) Prior Publication Data

US 2002/0056024 A1 May 9, 2002

(51) Int. Cl.[7] .............................................. G06F 13/00
(52) U.S. Cl. ..................... 711/109; 711/132; 711/154; 711/165; 710/57; 710/260; 712/225; 712/228
(58) Field of Search ................................. 711/132, 154, 711/119, 148, 171, 172, 109, 165; 710/57, 260; 712/225, 228

(56) References Cited

U.S. PATENT DOCUMENTS

| 5,398,330 A | 3/1995 | Johnson |
|---|---|---|
| 5,564,031 A | 10/1996 | Amerson et al. |
| 5,640,582 A | 6/1997 | Hays et al. |
| 5,713,038 A * | 1/1998 | Motomura ................... 712/41 |
| 5,893,121 A * | 4/1999 | Ebrahim et al. ............ 707/206 |
| 6,038,643 A * | 3/2000 | Tremblay et al. ........... 711/132 |
| 6,065,114 A | 5/2000 | Zahir et al. |
| 6,108,767 A * | 8/2000 | Damron ..................... 712/202 |
| 6,112,292 A | 8/2000 | Zahir et al. |
| 6,115,777 A | 9/2000 | Zahir et al. |
| 6,125,439 A | 9/2000 | Tremblay et al. |
| 6,148,391 A | 11/2000 | Petrick |
| 6,219,783 B1 | 4/2001 | Zahir et al. |
| 6,263,401 B1 | 7/2001 | Ross et al. |
| 6,289,418 B1 | 9/2001 | Koppala |
| 6,314,513 B1 * | 11/2001 | Ross et al. .................. 712/228 |

* cited by examiner

Primary Examiner—Do Hyun Yoo
Assistant Examiner—Jasmine Song
(74) Attorney, Agent, or Firm—Blakely, Sokoloff, Taylor & Zafman LLP (57) ABSTRACT

According to an embodiment of the invention, a processor comprises a register file and a register stack engine. The register file has a predetermined size and a set of registers in the register file is allocated when a function in a code sequence is called. The register stack engine saves the contents of a set of registers in a reserve storage area responsive to a function call if the function call would overflow the predetermined size of the register file. The register stack engine restores data from the reserve storage area to the register file if a recursive function call occurs.

39 Claims, 6 Drawing Sheets

PROCESSOR WITH REGISTER STACK ENGINE THAT DYNAMICALLY SPILLS/ FILLS PHYSICAL REGISTERS TO BACKING STORE

FIELD OF THE INVENTION

The present invention relates generally to the field of microprocessors; more particularly, to cache memories and cache memory hierarchies for use in improving the performance of processor-based computer systems.

BACKGROUND OF THE INVENTION

The push for higher performance levels in modern microprocessors has led to the development of new optimization techniques in architectural extensions. These features include speculation, predication, larger register files, a register stack, and an advanced branch architecture. Proposed architectural extensions provide for 64-bit capabilities. One way that new architectural features can enable high performance in future processor implementations is in the handling of high performance procedural calls and returns, which require all parameters between the calling and called procedures to be passed through registers. In traditional architectures, procedure calls retard performance since registers must be spilled and filled repeatedly. By way of example, as nested and recursive calls are encountered in a program, additional registers may need to be allocated to the parameter stack, which will eventually overflow the physical register file size. This condition has created a need for new procedures and apparatus to communicate register usage to the processor. It is desirable in new architectural extensions to avoid the unnecessary spilling and filling of registers at procedure call and return interfaces.

SUMMARY OF THE INVENTION

The present invention provides a processor for executing a code sequence that includes multiple function calls comprising a register file having a predetermined size and a means for allocating sets of registers on a per-function call basis. Additionally, a reserve storage area is included and a means for saving a particular set of registers in the reserve storage area responsive to a function call that would overflow the predetermined size of the register file.

BRIEF DESCRIPTION OF THE DRAWINGS

The present invention is illustrated by way of example, and not limitation, in the figures of the accompanying drawings, where.

DETAILED DESCRIPTION

Throughout the following description specific details are set forth in order to provide a more thorough understanding of the invention. However, the invention may be practiced without these particulars. In other instances, well known elements have not been shown or described in detail to avoid unnecessarily obscuring the present invention.

A new processor is described with an apparatus that improves performance by implementing a register stack engine (RSE) mechanism that operates concurrently with a backing store memory. This mechanism avoids the unnecessary spilling and filling of registers which typically occurred in traditional architectures during procedure calls. The invented processor enables procedures to communicate register usage to the processor through compiler-controlled renaming.

At a call site, a new frame of registers is made available to the called procedure without the need for register spill and fill (either by the caller or by the callee). Register access occurs by renaming the virtual register identifiers in the instructions through a base register into the physical registers. The callee can freely use available registers without having to spill and eventually restore the caller's registers. The callee executes an allocate (i.e., alloc) instruction specifying the number of registers it expects to use in order to ensure that enough registers are available. If sufficient registers are not available (i.e., stack overflow), the alloc stalls the processor and spills the caller's registers until the requested number of registers are available. In essence, the RSE operates to take advantage of unused memory bandwidth to dynamically issue register spill and fill operations. In this manner, the latency of register spill/fill operations is overlapped with useful program work.

Figure 1:
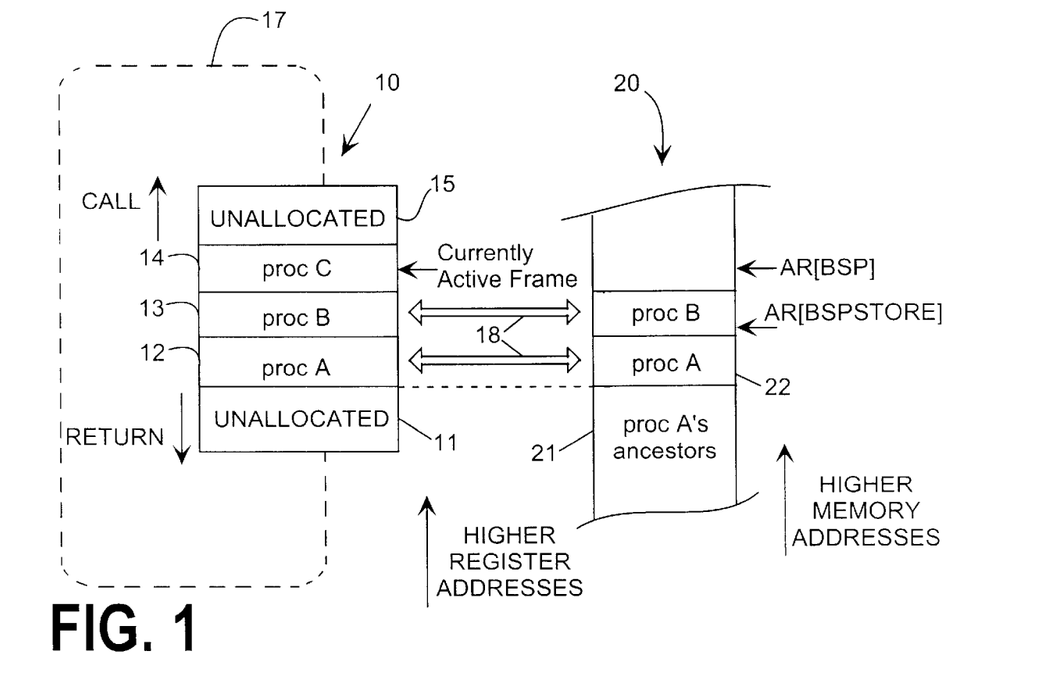
FIG. 1 illustrates a mapping of register stack frames into a set of physical registers in accordance with the present invention.

According to the embodiment of the present invention shown in FIG. 1, the register stack frames are mapped into the set of physical registers 10 which operate as a circular buffer (indicated by dashed line 17) containing the most recently created frames. The physical registers are utilized to pass parameters between the calling and the call procedures being executed by the program running on the processor. As nested and recursive calls are encountered, additional registers are allocated to the parameter stack, which may eventually overflow.

One of the functions of the register stack engine is to perform a backing store operation to a backing store memory 20 to save and restore registers that would overflow the physical register file size. The RSE moves the contents of registers between the physical register stack 10 and the backing store memory 20 without explicit program intervention. In the current implementation, the backing store memory 20 comprises a dedicated cache that is optimized for the particular memory access pattern of the RSE. By implementing the backing store as a dedicated cache, the backing store traffic does not interfere with the normal execution traffic of the processor. The operation of spilling/ filling between the physical registers and the backing store is accomplished through ordinary logic, which may be associated with the cache memory.

With continuing reference to FIG. 1, the RSE operates on the physically stacked registers outside of the currently active frame as defined by a current frame marker. As indicated in FIG. 1, frame 14 which contains the registers associated with procedure C (i.e., proc C) is the currently active frame. The registers outside of the currently active frame contain the frames of the parent procedures of the current procedure. In FIG. 1, theses registers are the registers of frames 12 and 13 associated with proc A and proc B, respectively. Physical register stack 10 is also shown having two unallocated sets of registers 11 and 15. Unallocated registers 11 are defined in one embodiment as global registers, meaning that they do not get overwritten and they do not change context from procedure to procedure. Unallocated registers 15 represent the available register space that exists in physical register stack 10.

The embodiment of FIG. 1 shows backing store memory 20 organized as a stack that grows from lower to higher memory addresses. A backing store pointer (BSP) application register, denoted in FIG. 1 as AR[BSP], is utilized to store the address of the first (i.e., lowest) memory location reserved for the current frame. In other words, this represents the location at which the registers associated with the current frame are spilled. RSE spill/fill activity occurs at addresses below what is contained in the BSP since the RSE spills/fills the frames of the current procedure's parents. A second application register, denoted AR[BSPSTORE], contains the address at which the next RSE spill will occur. Note that the address register which corresponds to the next RSE fill operation, BSP load pointer, is not architecturally visible.

Also illustrated in FIG. 1 by arrows 18 are RSE loads/stores. The RSE load/store operations transfer the contents between the physical registers 10 and the backing store memory 20. Accordingly, backing store memory 20 contains a set of addresses 22 corresponding to the contents of registers in frame 12, and also a second set of memory addresses 23 that store the contents of frame 13 from the physical stack.

Figure 2:
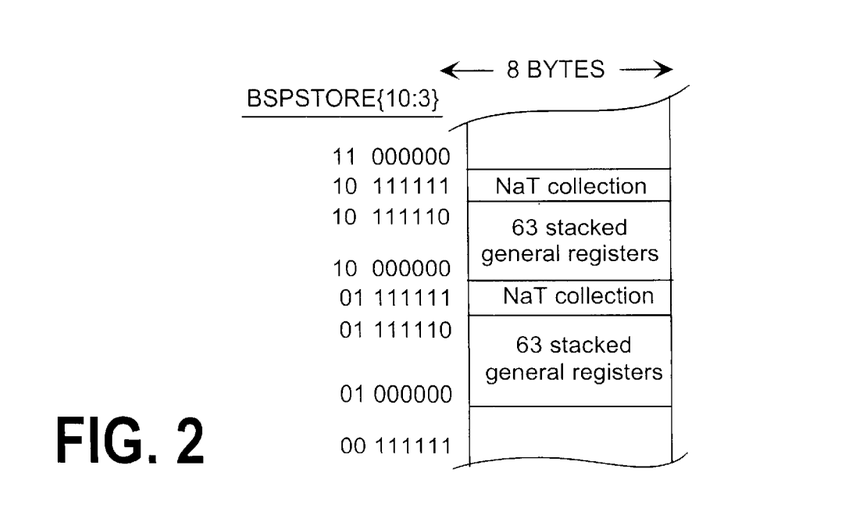
FIG. 2 shows one possible implementation of the backing store memory format in accordance with one embodiment of the present invention.

Referring now to FIG. 2, there is shown one possible implementation of the backing store memory format. Within each stacked frame, lower-addressed registers are stored at lower memory addresses. Note that the RSE also spills/fills the NaT bits corresponding to the stacked registers. (The NaT bits are the 64th bit of each general register.) When the RSE spills a register to the backing store, the corresponding NaT bit is copied to the RSE NaT collection application register.

Whenever bits 8:3 of BPSSTORE application register are all 1's, the RSE stores the NaT collection application register to the backing store. As shown in FIG. 2, this results in a backing store memory image in which every 63-register value is followed by a collection of NaT bits. When the RSE fills a stacked register from the backing store it also fills the register's NaT bit. Whenever bits 8:3 of the RSE backing store load pointer are all 1's, the RSE reloads a NaT collection from the backing store.

As previously discussed, the RSE operates concurrently and a synchronously with respect to instruction execution to dynamically perform registers spill and fill operations. The algorithm employed by the RSE to determine whether and when to spill/fill is implementation dependent.

Figure 3:
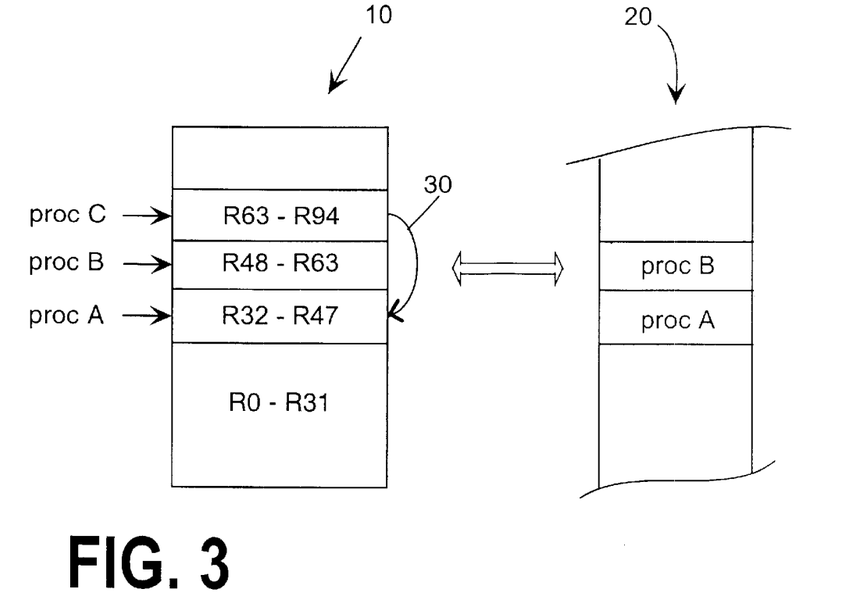
FIG. 3 is an example showing the operation of one embodiment of the present invention.

To better understand and appreciate the present invention, consider the following example. Assume that at the beginning of a program or code sequence, that all registers in the physical register stack are available. That is, all of the registers are totally unused. As the program calls a first procedure (proc A), the RSE allocates the appropriate number of registers required for the procedure. As shown in FIG. 3. proc A requires 16 registers R32–R47. recall that registers R0–R31 are addressed as global registers in physical register stack 10. Internally, proc A views the allocated registers as R32–R47 as well. (Note that there is a pointer in the RSE that indicates the place in physical stack register 10 wherein the next allocation begins.)

Further assume that proc A calls a second procedure, proc B, which requires, say, another 16 registers, for example. To accommodate proc B, the RSE of the processor allocates another 16 registers of the physical register stack 10—R48–R63—and dedicates these registers to proc B. The mapping occurs in such a way that, internally, proc B refers to these registers as R32–R47 (with R0–R31 being addressed within proc B as the global register set).

At the same time that the RSE allocates registers for the various procedures and maintains pointers to the next available registers, the RSE also manages the backing store cache memory 20. As the register pressure builds and more and more registers are used up by the program being executed, the RSE starts saving the contents of the registers that were used previously into the backing store memory. As shown in FIG. 3, the contents of the registers associated with the various procedures are stored in the cache memory in a stack fashion.

As the processor deallocates register usage—by completing a task associated with the procedure and returning—the RSE then frees register space by marking the previously used registers as being available once again. Registers are made available when the procedure that was utilizing the registers is no longer in context.

FIG. 3 is an example showing the operation of one embodiment of the present invention. The example illustrates how each time a procedure is called a new procedure stack is allocated, since a procedure can be called multiple times with different arguments. This is also true for recursive function calls. In the example of FIG. 3, proc C is called by proc B, however, proc C recursively calls back proc A, as indicated by arrow 30. In this case, if the registers associated with proc A had already been saved into memory 20, the RSE restores the contents of that register set. In other words, RSE keeps a list of which procedures are active and the status of the procedure (i.e., whether in memory or in the physical register stack). The list may be stored in a variety of ways, such as an ordinary table memory, a reserved set of register space, or other common storage locations.

In one possible implementation, the RSE operates in a "eager mode" in which the RSE speculatively is working ahead of program execution. The eager mode attempts to anticipate when the register stack will overflow, and begins actively saving those registers into memory 20 in anticipation of an overflow condition. A simple high/low "water mark" indicator can be utilized to trigger the register saving operations. Once a certain number of registers have been filled up in the physical register stack, the RSE's eager mode of operation will begin saving the contents of those registers to the cache memory.

Note that this implementation is not limited in the sense that a variety of different prediction or saving algorithms may be employed. Practitioners in the art will clearly appreciate that the micro-architecture of the processor does not necessarily have to implement eager mode of operation. Similarly, although the processor of the present invention is advantageously implemented with an RSE dedicated cache to alleviate normal RSE bus traffic, this is simply one micro-architectural scheme. Broadly speaking, the present invention encompasses a virtual memory scheme for registers. In other words, the backing store memory can be implemented in a variety of different manners.

Another possibility is to implement a mode in which the RSE only operates synchronously with respect to instruction execution—that is, only on program demand. This is known as a "lazy mode" of operation. In such a mode, software cannot assume anything about the behavior of the spill/fill algorithm used by any particular implementation.

It will be further appreciated that the sizing of the backing store cache is dependent on processor design considerations. One way to implement the cache memory size is to perform certain performance analysis tests on the processor to see how large the cache memory should be, weighing the performance benefits against the costs in terms of silicon area. Ideally, it is desirable to make the cache memory on the same chip as the processor. In that way, the data can be saved and restored quickly without interfering with normal processor data/instruction fetch traffic.

Table I describes the architectural state that is maintained internally by the register stack engine. The RSE internal state elements described in Table I are not exposed to the programmer as architecturally visible registers. As a consequence, RSE internal state does not need to be preserved across context switches or interruptions. Instead it is modified as the side effect of register stack-related instructions. To distinguish them from architecturally visible resources, all RSE internal state elements are prefixed with "RSE".

TABLE I

| NAME | DESCRIPTION |
| --- | --- |
| RSE.N_STACKED_PHYS | Implementation - dependent size of the stacked physical register file |
| RSE.BOF | Bottom of frame register number. Corresponds to the memory location pointed to by AR[BSP] |
| RSE.TOF | Top of frame register number |
| RSE.StoreRegNum | The physical register number of the next register to be stored by RSE. Corresponds to the memory location pointed to by AR[BSPSTORE} |
| RSE.LoadRegNum | Physical register number one greater than the next register to load. Corresponds to memory location pointed to by RSE.BSPLOAD |
| RSE.BSLOAD | Backing store pointer for memory loads. Corresponds to stack register pointed to by RSE.LoadRegNum |
| RSE.RNATBitIndex | b-bit wide RNAT Collection Bit Index (defines which RNAT collection bit gets updated). Equal to AR[BSPSTORE] {8:3} |
| RSE.CFLE | RSE Current frame load enable bit that allows the RSE to load registers into the current frame after a branch return |

The minimum number of stacked physical registers that an implementation may provide is equal to the architecturally defined size of the stacked register file, which in one embodiment is 96 registers. The stacked set of registers comprises four different regions. The first region is a "clean" region in which the registers contain values from parent procedure frames. These registers have been successfully spilled to the backing store by the RSE, and their contents have not been modified since they were written to the backing store. The clean region begins with the register pointed to by RSE.LoadRegNum and continues up to, but not including, the register pointed to by RSE.StoreRegNum. The corresponding locations of the backing store begin with the address RSE.BSPLOAD and continue up to, but not including, the address stored in application register AR[BSPSTORE].

Note that if RSE.LoadRegNum is equal to RSE.StoreRegNum, then the clean region is empty (i.e., RSE.BSPLOAD=AR[BSPSTORE]).

The second region is the "dirty" region in which the registers contain values from previous procedure frames. These registers have not yet been spilled to the backing store by the RSE. The dirty region begins with the register pointed to by the RSE.StoreRegNum and continues up to, but not including, the register pointed to by RSE.BOF. The corresponding locations on the backing store start with address AR[BPSTORE] and continue up to, but not including, AR[BSP]. Note that if RSE.StoreRegNum is equal to RSE.BOF, then the dirty region is empty (AR[BSPSTORE]=AR[BSP]). The active region contains registers allocated to the current stack frame.

The third region, the "active" region, begins with the register pointed to by RSE.BOF and continues up to, but not including, the register pointed to by RSE.TOF.

Figure 4:
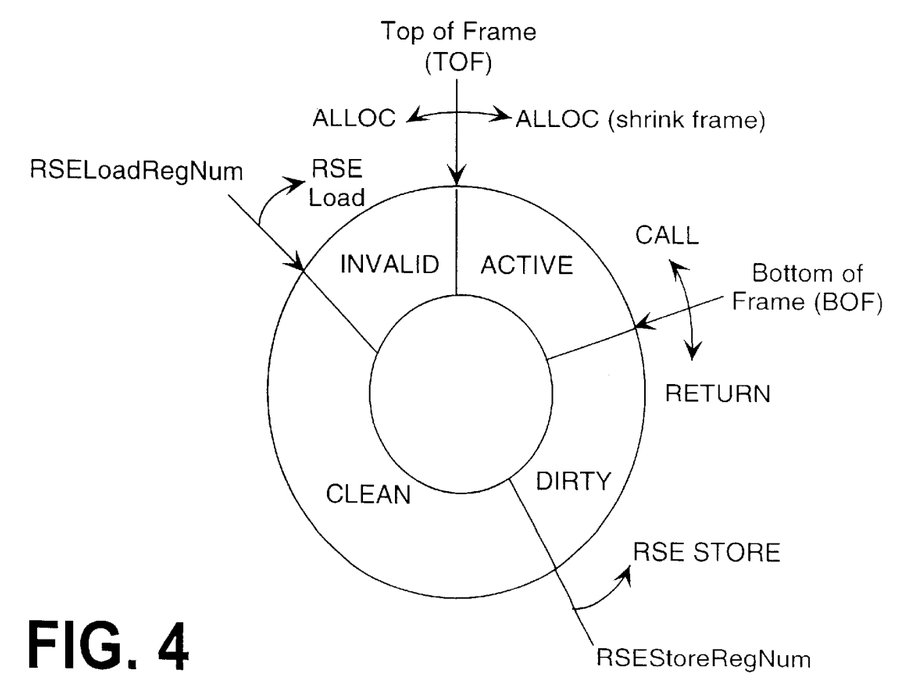
FIG. 4 illustrates various regions the register stack engine in accordance with one embodiment of the present invention.

Finally, the "invalid" region is reserved for registers outside the current frame not belonging to any previous procedure frame. These registers are immediately available for allocation by the current procedure, or for eager RSE fill operations. The invalid region begins with the register pointed to by RSE.TOF and continues up to, but not including, the register pointed to by RSE.LoadRegNum. If RSE.TOF is equal to RSE.LoadRegNum, then the invalid region is empty. An illustration of the register stack and various regions is shown in FIG. 4.

Note that the registers can be viewed as a circular buffer. The register pointers RSE.LoadRegNum, RSE.StoreRegNum, RSE.TOF, and RSE.BOF wrap around the stack when incremented above the top, or decremented below the bottom, of the physical stacked register set.

Consider the case where a program requests a new stack frame, which is larger than the current frame with an alloc instruction. Recall that the clean region of the stack contains those registers whose values are preserved, having been written to the backing store by the RSE; the invalid region of the stack contains those registers whose values are not part of any previous procedure stack frame. Any register belonging to either of these two regions may be allocated to the new stack frame without any mandatory spill or fill operations being performed by the RSE. The reason why is because any clean registers that are allocated into the new frame may be restored later by reloading their values from the backing store.

Furthermore, any invalid registers that are allocated to the new frame do not contain useful values. When the program requests a new stack frame with an alloc instruction, and the register stack is unable to supply enough registers for the new frame from the combined pool of clean and invalid registers, the RSE suspends subsequent instruction execution and spills enough registers from the dirty region of the register file to satisfy the programs request. This condition is known as overflow.

Figure 5A:
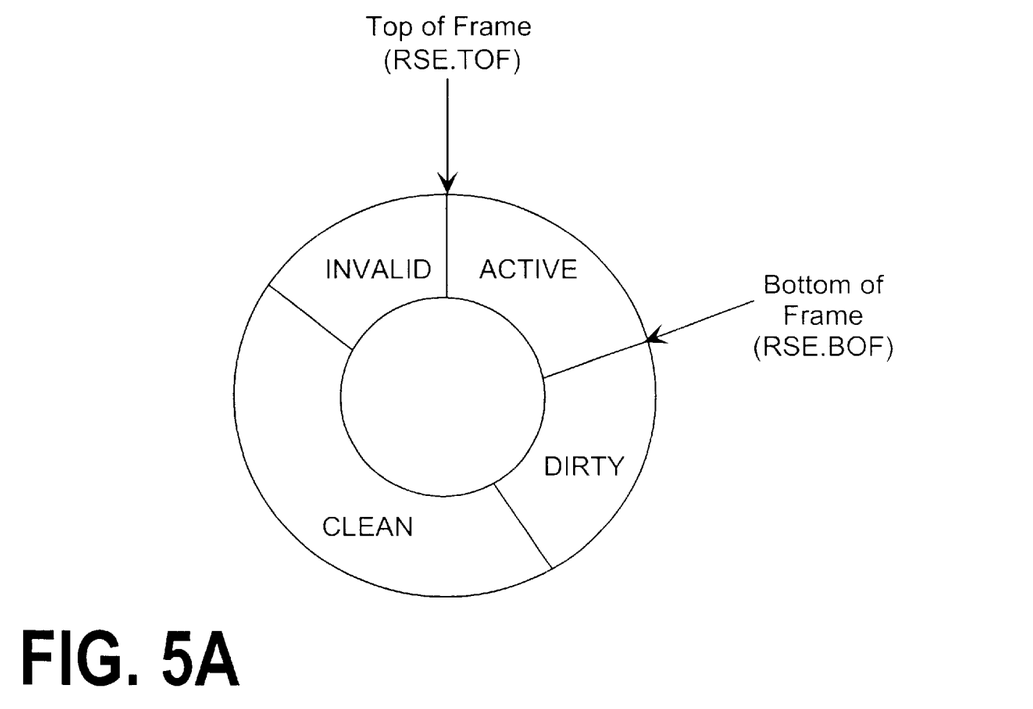
FIGS. 5A and 5B show an example of register stack overflow.
Figure 5B:
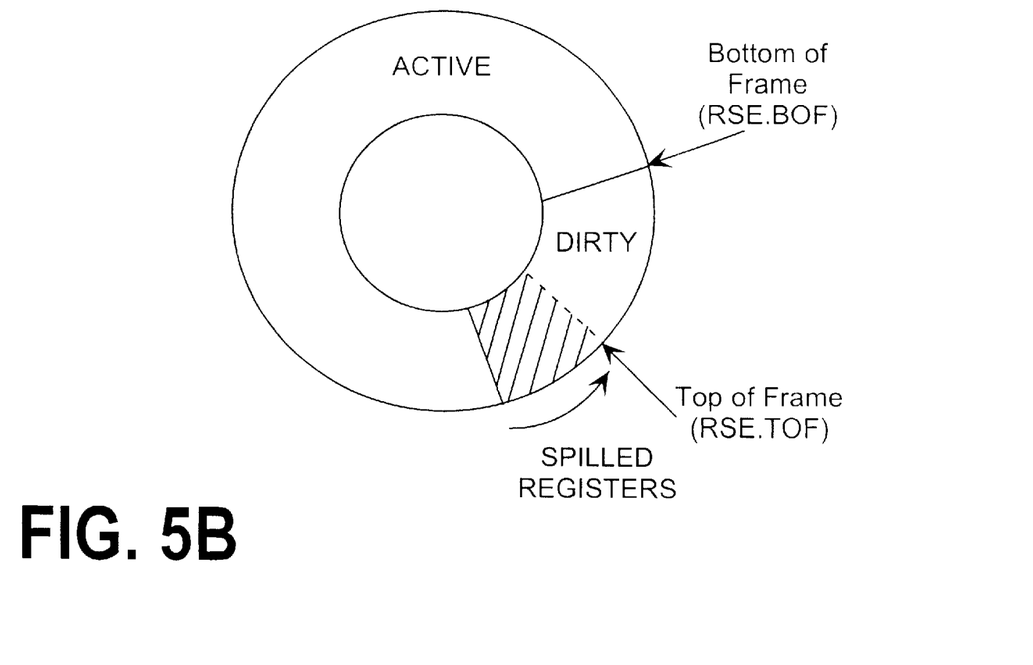

FIGS. 5A and 5B show an example of register stack overflow. FIG. 5A shows the register stack state prior to an alloc instruction. FIG. 5B shows the register stack state once the alloc instruction has been executed, but before the registers have been spilled from the dirty region. One can imagine overflow as the encroachment of the active region onto the dirty region, where the clean and invalid regions snap to the top of the active frame. The clean and invalid regions have their sizes set to zero since the registers have been allocated to the new active frame.

Figure 6A:
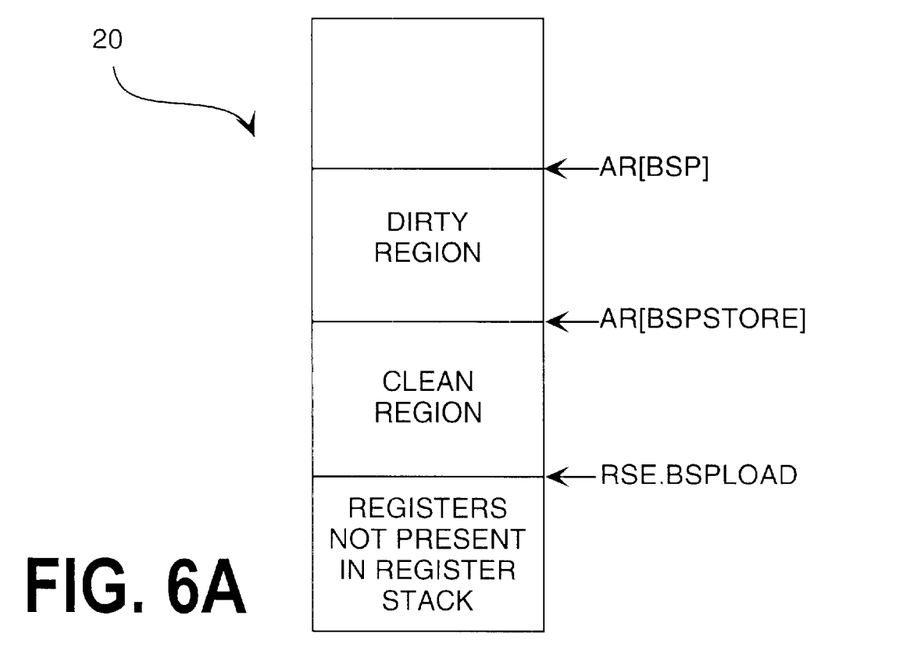
FIGS. 6A and 6B show the backing store states corresponding to FIGS. 5A and 5B, respectively.
Figure 6B:
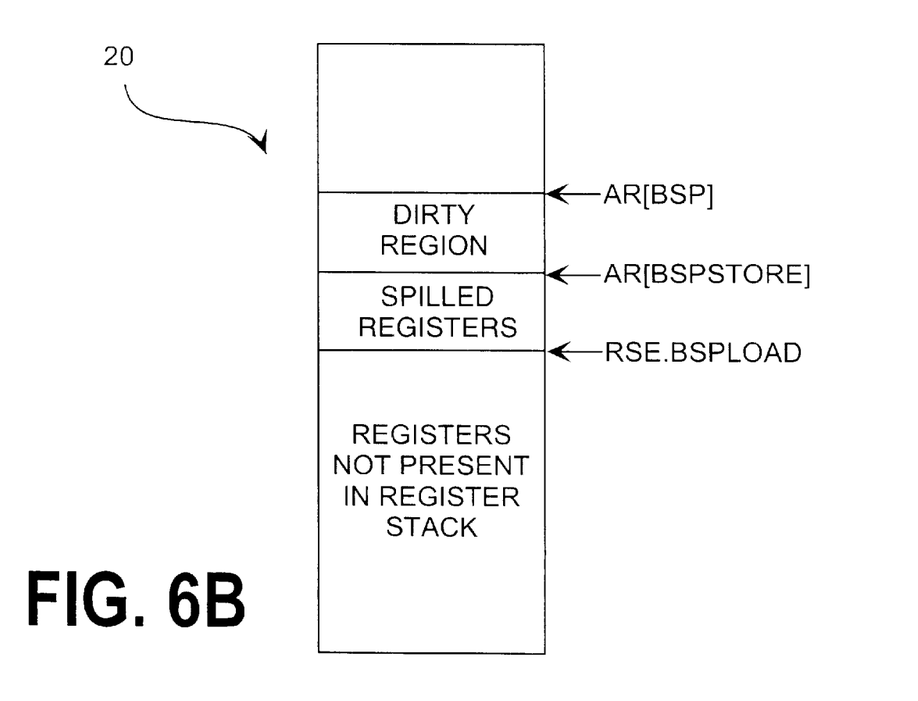

FIGS. 6A and 6B show the backing store states corresponding to FIGS. 5A and 5B, respectively. When the overflow condition is resolved, i.e., when the RSE has filled all the necessary registers, RSE.StoreRegNum is equal to RSE.LoadRegNum, and AR[BSPSTORE] is equal to RSE.BSPLOAD.

Next cnsider the case where the program deallocates the current stack frame by returning to a previous frame, e.g., via a branch return. For a branch return, growth is typically negative, but it does not have to be this way. The registers being deallocated are added to the invalid region since they are no longer part of the active frame, nor do they contain valid values belonging to any previous frame.

Figure 7A:
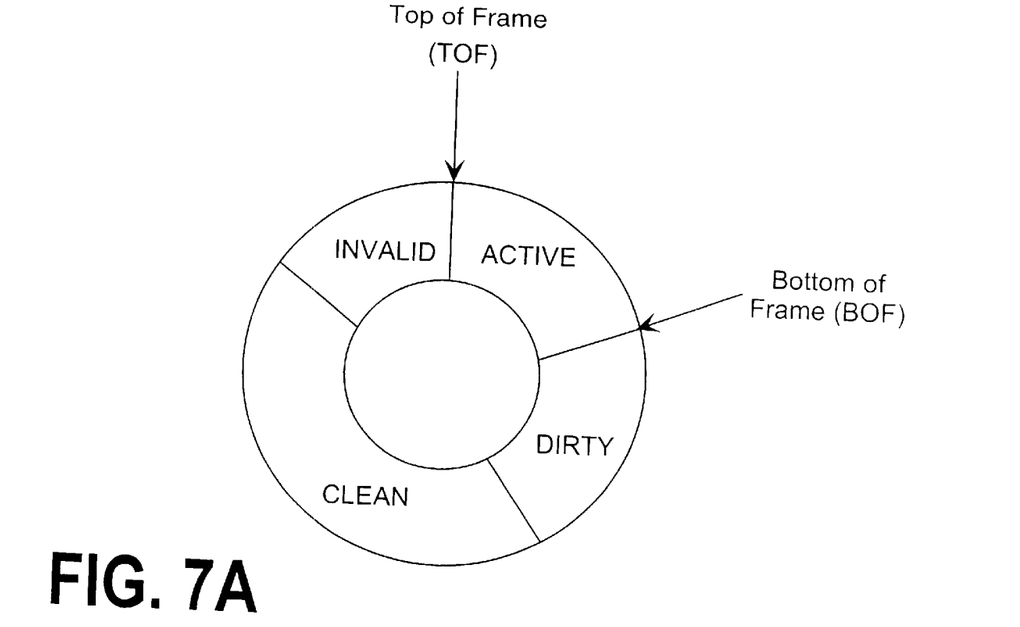
FIGS. 7A and 7B show an example of register stack underflow.
Figure 7B:
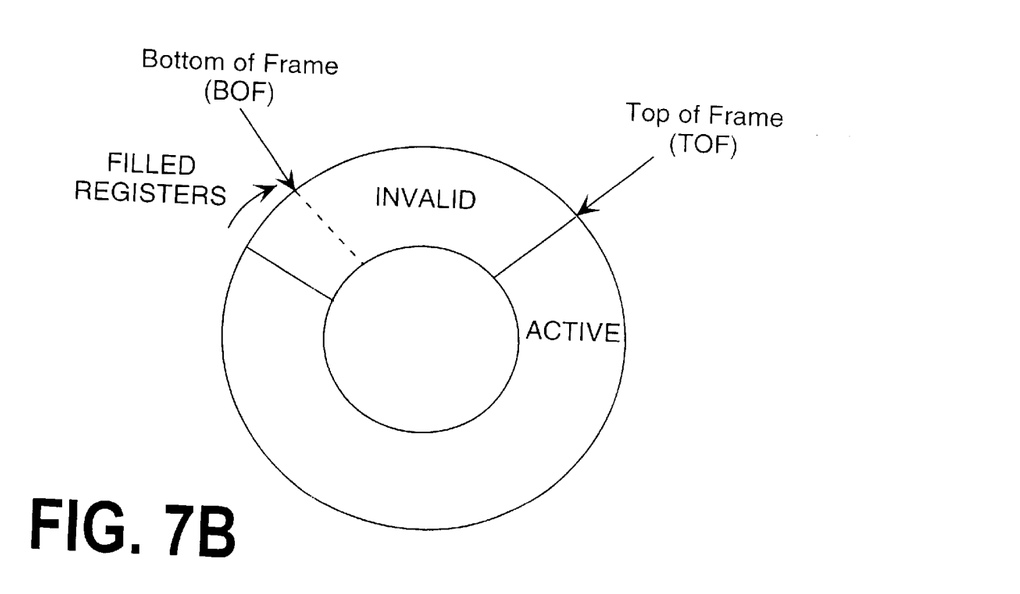
Figure 8A:
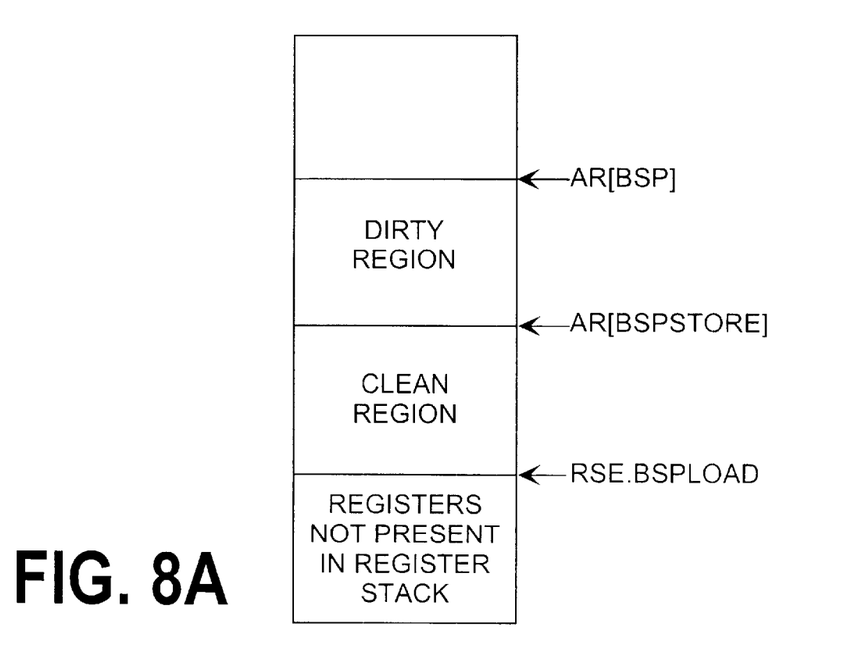
FIGS. 8A and 8B show the backing store states corresponding to FIGS. 7A and 7B, respectively.
Figure 8B:
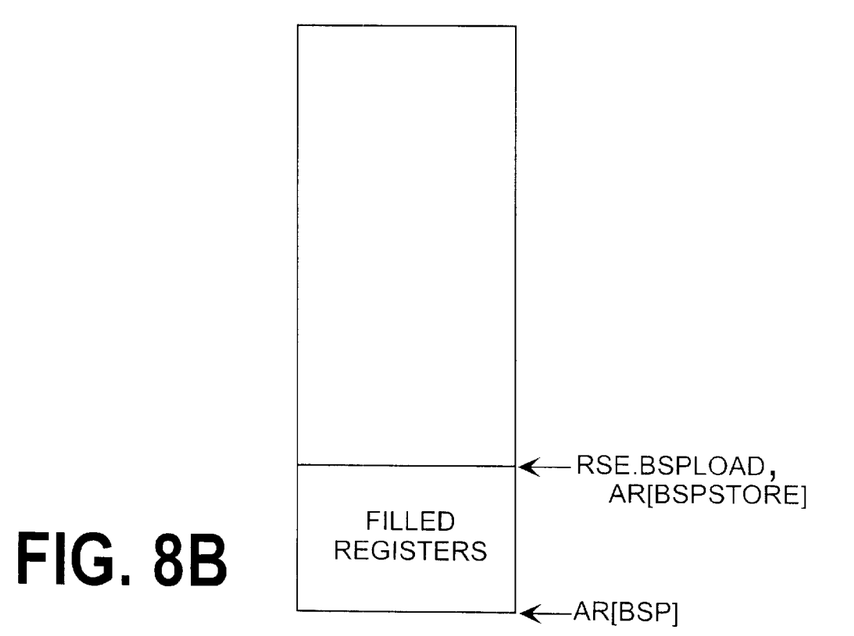

The register stack regions "below" RSE.BOF are the dirty region, the clean region, and the invalid region, in that order. If RSE.BOF drops by an amount such that its new value falls into either the dirty or clean regions, then no mandatory spills or fills are required since the dirty and clean regions contain valid register values from previous stack frames. If RSE.BOF drops by an amount such that its new value falls into the invalid region, and the number of registers in the new stack frame will contain invalid values. The RSE then halts subsequent instruction execution and fills these registers from the backing store. This condition is known as underflow. FIGS. 7A and 7B show an example of register stack underflow. FIG. 7A shows the condition of the stack prior to branch return, with FIG. 7B illustrating the state of the register stack after branch return. FIGS. 8A and 8B show the backing store states corresponding to FIGS. 7A and 7B, respectively.

I claim:

1. A processor comprising:
   a register file having a predetermined size, a set of registers in the register file being allocated when a function in a code sequence is called; and
   a register stack engine, the register stack engine saving the contents of a set of registers in a reserve storage area responsive to a function call if the function call would overflow the predetermined size of the register file, the register stack engine restoring data from the reserve storage area to the register file if a recursive function call occurs.

2. The processor of claim 1, wherein the code sequence includes a plurality of function calls.

3. The processor of claim 1, wherein the processor deallocates a set of registers when a task specified by a function call associated with the set of registers has been completed.

4. The processor of claim 1, wherein the reserve storage area comprises an area of a random access memory.

5. The processor of claim 1, wherein the reserve storage area comprises a dedicated cache memory.

6. A processor comprising:
   a register file, the register file including a plurality of registers;
   a reserved memory area; and
   a unit that:
      allocates a set of registers for [the call of]a function call, the unit saving the contents of certain registers in the reserved memory area when a function is called that requires allocation of a number of registers that exceeds an available number of registers of the register file,
      restores the contents of a set of registers for a function from the reserved memory area to the register file responsive to a recursive call of the function, and
      deallocates the set of registers upon completion of the function.

7. The processor of claim 6, wherein the unit further includes a pointer to indicate a starting place in the register file for a next allocation of a set of registers.

8. The processor of claim 6, wherein the unit includes a table to track which functions are currently stored in the reserved memory area.

9. The processor of claim 6, wherein the reserved memory area comprises a dedicated cache memory.

10. A method comprising:
    executing an instruction with a processor, the execution of the instruction including making a frame of registers in a register file available to a called procedure;
    stalling the processor in response to an overflow condition, the overflow condition including that a sufficient number of registers are not available in the register file to accommodate the called procedure;
    performing a backing store operation, the backing store operation including saving the contents of one or more registers to a dedicated memory; and
    restoring the contents of register from the dedicated memory to the register file, including restoring the contents of a set of registers for a function from the dedicated memory to the register file responsive to a recursive call of the function.

11. The method of claim 10, wherein the dedicated memory comprises a cache memory.

12. The method of claim 10, wherein the dedicated memory comprises random access memory.

13. The method of claim 10, further comprising: triggering a backing store operation in anticipation of the overflow condition; and saving the contents of registers to the reserve memory as part of the backing store operation.

14. The method of claim 13, wherein triggering a backing store operation includes identifying when a certain number of registers in the physical register file have been filled.

15. A processor comprising:
    a register file comprising a stacked set of physical registers, a frame of registers of the register file being allocated associated with a procedure call, the register file being comprised of a plurality of regions, the plurality of regions including:
       an active region of registers,
       a clean region of registers containing values from a parent frame that have been spilled to memory, and
       a dirty region of registers containing values from a previous frame that have not been spilled to memory; and
    a cache dedicated for use as a backing store memory associated with the register file.

16. The processor of claim 15, wherein the active region contains registers allocated to a current frame.

17. The processor of claim 15, wherein the register file further includes an invalid region reserved for registers outside of the current frame that are available for allocation by a current procedure or an anticipatory spill operation.

18. The processor of claim 17, wherein the invalid region further contains registers not associated with the previous frame.

19. The processor of claim 15, further comprising a plurality of register pointers that wrap around the physical registers of the register file in a circular manner, with a first pointer identifying a first register of the clean region, and a second pointer identifying a last register in the clean region.

20. A method comprising:
    receiving a code sequence, the code sequence including a plurality of procedure calls;
    calling one of the plurality of procedure calls;
    allocating a first set of registers in response to the called procedure, the first set of registers being a part of a registers file, the register file having a certain size, the procedure call resulting in an overflow condition for the register file;

saving the contents of a second set of registers in a reserve storage area, the second set of registers being a part of the register file; and if a recursive procedure call occurs, restoring the contents of a set of register associated with the procedure call from the reserve storage.

21. The method of claim 20, further comprising de-allocating the first set of registers when the procedure call is completed.

22. The method of claim 20, wherein the register file includes at least the following regions:

a first region containing values from one or more parent procedure frames;

a second region containing values from one or more previous procedure frames;

a third region containing values for a current procedure frame; and a fourth region reserved for registers outside of the current frame that do not contain values from a previous procedure frame or parent procedure frame.

23. The method of claim 22, wherein the overflow condition occurs if the executed function requires more register space than is available in the first, third, and fourth regions.

24. The method of claim 23, wherein the register file operates as a circular buffer.

25. The method of claim 20, wherein execution of the sequence of instructions is halted when the overflow condition occurs and wherein execution of the sequence of instructions is resumed when the overflow condition is resolved.

26. The method of claim 20, further comprising anticipating when an overflow condition will occur and saving the contents of a set of registers into the reserve storage area before the overflow condition occurs.

27. The method of claim 20, wherein the reserve storage area is a dedicated cache memory.

28. The method of claim 20, wherein the reserve storage area is an area of random access memory.

29. The method of claim 20, wherein transfers of data between the register file and the reserve storage area occur concurrently with execution of the sequence of instructions.

30. A microprocessor comprising:

a register file comprising a plurality of registers, the register file having a certain size;

a unit, the unit allocating a frame of registers in the register file upon receiving a call to a procedure, the unit saving the contents of a set of registers in a reserve storage area if the procedure call results in an overflow condition for the register file, the unit restoring the contents of a set of registers for a function from the reserve storage area to the register file if a recursive call of the function occurs.

31. The microprocessor of claim 30, wherein the microprocessor deallocates the frame of registers when the procedure call is completed.

32. The microprocessor of claim 30, wherein the register file includes at least the following regions:

a first region containing values from one or more parent procedure frames;

a second region containing values form one or more previous procedure frames;

a third region containing values for a current procedure frame; and a fourth region reserved for registers outside of the current frame that do not contain values from a previous procedure frame or parent procedure frame.

33. The microprocessor of claim 32, wherein the overflow condition occurs if the executed function requires more register space than is available in the first, third, and fourth regions.

34. The microprocessor of claim 33, wherein the register file operates as a circular buffer.

35. The microprocessor of claim 30, wherein the microprocessor halts the execution of a sequence of instructions when the overflow condition occurs and wherein the microprocessor resumes execution of the sequence of instructions when the overflow condition is resolved.

36. The microprocessor of claim 30, wherein the unit further anticipates when an overflow condition will occur and saves the contents of a set of registers into the reserve storage area before the overflow condition occurs.

37. The microprocessor of claim 30, wherein the reserve storage area is a dedicated cache memory.

38. The microprocessor of claim 30, wherein the reserve storage area is an area of random access memory.

39. The microprocessor of claim 30, wherein transfers of data between the register file and the reserve storage area occur concurrently with execution of a sequence of instructions.

* * * * *

UNITED STATES PATENT AND TRADEMARK OFFICE
CERTIFICATE OF CORRECTION

PATENT NO.    : 6,487,630 B2
DATED         : November 26, 2002
INVENTOR(S)   : Bui It is certified that error appears in the above-identified patent and that said Letters Patent is hereby corrected as shown below:

Column 3,
Line 67, delete "recall", insert -- Recall --.

Column 4,
Line 4, delete "wherein", insert -- where --.

Column 7,
Line 3, delete "cnsider", insert -- consider --.

Column 8,
Line 47, after "register file", insert -- , the contents of a set of registers for a function being restored from the cache to the register file responsive to a recursive call of the function --.

Signed and Sealed this

Twenty-second Day of April, 2003

JAMES E. ROGAN
*Director of the United States Patent and Trademark Office*